March 26, 1968  A. M. PETERSON  3,375,044
HANDLE ADAPTER FOR TOOLS
Filed May 4, 1967
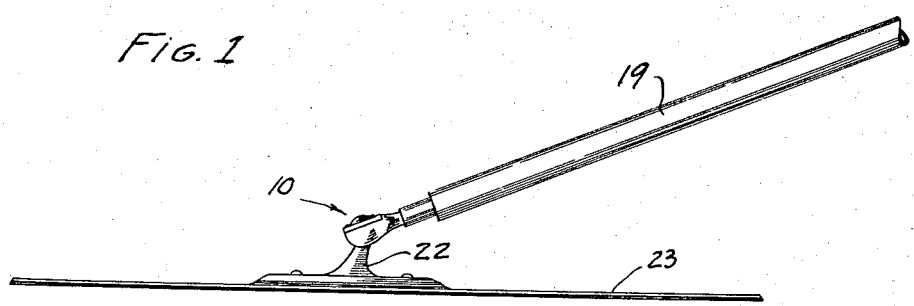
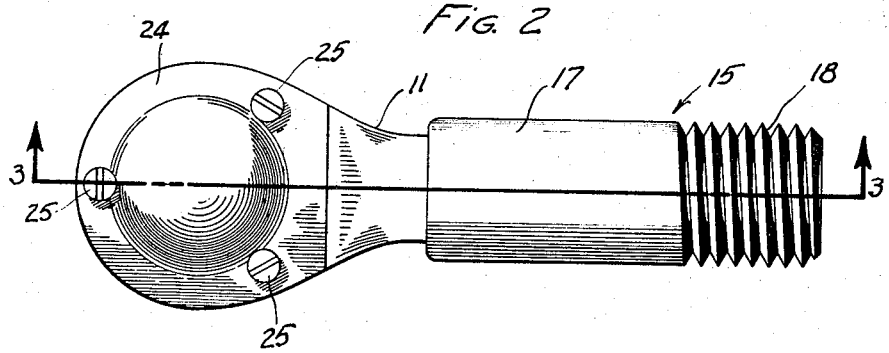
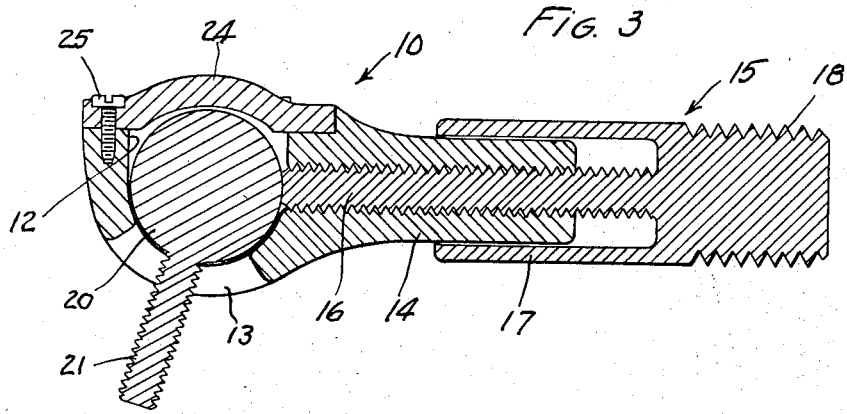
INVENTOR:
ARNOLD M. PETERSON
BY:
ATTORNEYS

United States Patent Office 3,375,044
Patented Mar. 26, 1968

3,375,044
HANDLE ADAPTER FOR TOOLS
Arnold M. Peterson, 655 North 7th West,
Provo, Utah 84601
Filed May 4, 1967, Ser. No. 636,093
1 Claim. (Cl. 306—9)

ABSTRACT OF THE DISCLOSURE

An adapter for connecting tools and tool handles, including a housing, a ball in the housing having a threaded stem projecting through a slot in the housing, a cover plate allowing easy access to the ball and removal of the ball from the housing and a coupling having a shaft threaded into the housing through a boss thereof and a sleeve slidable around the boss.

Brief description

This invention relates to adapters used to interconnect a handle and a tool proper. It is particularly concerned with providing such an adapter that will allow pivotal movement of the tool with respect to the handle and that will immobilize the tool with respect to the head.

In the past a number of universal type connectors have been deevloped to interconnect special tools and handles, and some of these have been constructed to allow for easy adjustment and locking of the tool with respect to the handle. However, there remains a need for such an adapter that is easily and economically constructed, that will provide easy and positive locking of the handle with respect to the tool and that can be used with a variety of tools.

Principal features of the invention include the cover plate closed ball receiving housing, a universal ball having a threaded stem projecting through a slot in the housing for connection with a tool, and a coupling, threaded at one end to connect to a handle, provided with a stem, threaded through a boss into the housing to bear against and immobilize the ball.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

The drawing

FIG. 1 is a side elevation view of the adapter, as used with a cement finishing tool and handle;

FIG. 2, an enlarged, top plan view of the adapter; and

FIG. 3, a vertical section view, taken on the line 3—3 of FIG. 2.

Detailed description

In the illustrated preferred embodiment, the adapter of the invention, shown generally at 10, includes a housing 11, with a concave interior 12, formed in a large end, and a slot 13 formed through the wall of the housing, opposite the mouth of the concave interior.

At one side of the housing, between the mouth of the concave interior and the slot 13, a boss 14 is formed as part of the housing.

A coupling 15 includes a stem 16 that is threaded through boss 14 and a sleeve 17 that extends around the boss. The exterior surface of coupling 15, at the end opposite stem 16 is threaded (as at 18, for easy connection to a handle 19, FIG. 1.

A ball 20 having a threaded stem 21 projecting therefrom is positioned in the concave interior 12, with the stem 21 projecting through slot 13 to be easily threaded into a receiving plate 22 connected to the tool 23.

A cover plate 24 is provided to fit over the mouth of the concave interior 12 and self-tapping screws 25 are inserted through holes 27 in the cover plate and into housing 11 to hold the ball in place.

In use, stem 21 is tightly threaded into receiving plate 22, and the handle 19 is threaded onto coupling 15. The handle and the coupling are turned to back stem 16 away from the ball and the handle is rotated horizontally and vertically to desired position. Thereafter, the handle and connector are rotated in the opposite direction until stem 16 abuts ball 20 to snub it tightly against the inner wall of the concave interior. The tool is thus firmly held with respect to the handle.

While the tool 23, illustrated, is a bull-float for use in concrete finishing work, it should be apparent that the adapter could as well be used with other tools.

When the ball is locked tightly in position, it seals slot 13, cover plate 24 seals the mouth of the concave interior, and the sleeve 17 fits closely around boss 14 to provide an effective seal. Material cannot, therefore, accumulate in the housing to prevent free movement of the housing with respect to the ball.

Whereas this invention is here described and illustrated with respect to a certain form thereof, it is to be understood that many variations are possible without departing from the subject matter particularly pointed out in the following claim, which subject matter I regard as my invention.

I claim:
1. An adapter for connecting a tool and a handle for the tool, comprising
   a housing having a concave spherical interior surface and an open end, a slot through the housing on the side opposite the open end of the housing, and an interiorly threaded boss extending from one side of the housing between the open end and the slot;
   a spherical ball seated on the spherical concave interior surface and closing said slot, said ball having a threaded stem projecting therefrom through the slot for receiving a tool;
   a cover plate removably fastened to and closing the end of the housing and engaging and holding the ball on the spherical concave interior surface;
   a stem threaded into said boss and being long enough to engage and snub the ball against the housing interior;
   a sleeve integral with one end of said stem and slidably extending closely around said boss in sealing engagement therewith; and
   a threaded stud on the end of said sleeve adapted to have a handle threaded thereon.

References Cited

UNITED STATES PATENTS

| | | | |
|---|---|---|---|
| 1,065,483 | 6/1913 | Turner | 287—90 |
| 1,122,953 | 12/1914 | Lamb | 287—90 |
| 1,124,073 | 1/1915 | Sullivan | 306—7 |
| 1,167,599 | 1/1916 | Sanford | 287—87 |
| 3,162,881 | 12/1964 | Negwer | 306—10 |

EDWARD C. ALLEN, *Primary Examiner.*

CARL W. TOMLIN, *Examiner.*

ANDREW KUNDRAT, *Assistant Examiner.*